(12) United States Patent
Ovshinsky et al.

(10) Patent No.: US 6,837,321 B2
(45) Date of Patent: Jan. 4, 2005

(54) HYBRID ELECTRIC VEHICLE INCORPORATING AN INTEGRATED PROPULSION SYSTEM

(75) Inventors: Stanford R. Ovshinsky, Bloomfield Hills, MI (US); Robert C. Stempel, Troy, MI (US)

(73) Assignee: Ovonic Battery Company, Inc., Troy, MI (US)

( * ) Notice: Subject to any disclaimer, the term of this patent is extended or adjusted under 35 U.S.C. 154(b) by 0 days.

(21) Appl. No.: 10/408,826

(22) Filed: Apr. 7, 2003

(65) Prior Publication Data

US 2003/0188901 A1 Oct. 9, 2003

Related U.S. Application Data

(63) Continuation of application No. 10/016,203, filed on Dec. 10, 2001, now Pat. No. 6,557,655, which is a continuation of application No. 08/979,340, filed on Nov. 24, 1997, now Pat. No. 6,330,925, which is a continuation-in-part of application No. 08/792,358, filed on Jan. 31, 1997, now Pat. No. 5,856,047, and a continuation-in-part of application No. 08/792,359, filed on Jan. 31, 1997, now Pat. No. 5,851,698.

(51) Int. Cl.⁷ .............................................. B60K 6/04
(52) U.S. Cl. .................................................... 180/65.3
(58) Field of Search ............................ 180/65.2, 65.3, 180/65.4, 68.5; 429/62, 71, 101, 211, 220, 223, 245; 428/550, 552

(56) References Cited

U.S. PATENT DOCUMENTS

| | | |
|---|---|---|
| 2,969,413 A | 1/1961 | Peters |
| 3,972,726 A * | 8/1976 | Schmitt .................. 252/182.1 |
| 4,335,429 A * | 6/1982 | Kawakatsu ................ 701/102 |
| 5,086,969 A | 2/1992 | Guerinault et al. |
| 5,096,667 A * | 3/1992 | Fetcenko ................... 420/580 |
| 5,246,797 A | 9/1993 | Imhof et al. |
| 5,248,510 A | 9/1993 | Lim et al. |
| 5,277,999 A * | 1/1994 | Ovshinsky et al. ........... 429/59 |
| 5,330,861 A * | 7/1994 | Fetcenko et al. ............. 429/57 |
| 5,343,970 A | 9/1994 | Severinsky |

(List continued on next page.)

FOREIGN PATENT DOCUMENTS

| | | |
|---|---|---|
| DE | 40 19 092 A1 | 12/1991 |
| EP | 0 595 757 A1 | 5/1994 |
| JP | 63-237357 | 10/1988 |
| JP | 63-239771 | 10/1988 |
| WO | WO 98/21767 | 5/1998 |

OTHER PUBLICATIONS

K. Brandt, U. Kohler, E. Niggemann, F. Bottcher, F.J. Kruger, *Progress On Advanced Electric Vehicle Batteries*, The 13th International Seminar on Primary and Secondary Battery Technology and Application, Mar. 4–7, 1996, Boca Raton, Florida, USA.

S.R. Ovshinsky, R.C. Stempel, S. Dhar, M.A. Fetcenko, P.R. Gifford, S. Venkatesan, D.A. Corrigan, R. Young, *Ovonic NiMH Batteries Technology—Advanced Technology for Electric Vehicle and Hybrid Electric Vehicle Applications*, The 29th International Symposium on Automotive Technology and Automation, Jun. 1996, Florence, Italy.

(List continued on next page.)

*Primary Examiner*—Frank Vanaman
(74) *Attorney, Agent, or Firm*—Philip H. Schlazer; Marvin S. Siskind

(57) ABSTRACT

A hybrid electric vehicle drive system comprising a combustion engine, an electric motor and at least one nickel metal hydride battery module forming a power source for providing electric power to the electric motor, the at least one nickel metal battery module having a peak power density in relation to energy density as defined by:

$$P > 1,375 - 15E$$

where P is the peak power density as measured in Watts/kilogram and E is the energy density as measured in Watt-hours/kilogram.

40 Claims, 4 Drawing Sheets

U.S. PATENT DOCUMENTS

| | | | |
|---|---|---|---|
| 5,348,822 A | * 9/1994 | Ovshinsky et al. | 429/223 |
| 5,434,019 A | * 7/1995 | Zhang et al. | 429/101 |
| 5,434,024 A | 7/1995 | Ikeda et al. | |
| 5,456,994 A | 10/1995 | Mita | |
| 5,480,741 A | 1/1996 | Sakai et al. | |
| 5,490,572 A | 2/1996 | Tajiri et al. | |
| 5,508,121 A | 4/1996 | Sawa | |
| 5,527,638 A | 6/1996 | Kinoshita et al. | |
| 5,567,549 A | * 10/1996 | Ovshinsky et al. | 429/223 |
| 5,582,935 A | 12/1996 | Dasgupta et al. | |
| 5,585,204 A | * 12/1996 | Oshida et al. | 429/62 |
| 5,620,057 A | 4/1997 | Klemen et al. | |
| 5,639,571 A | 6/1997 | Waters et al. | |
| 5,640,669 A | 6/1997 | Harada et al. | |
| 5,667,915 A | 9/1997 | Loustau et al. | |
| 5,690,799 A | 11/1997 | Tsukahara et al. | |
| 5,697,466 A | 12/1997 | Moroto et al. | |
| 5,747,186 A | * 5/1998 | Morishita et al. | 429/53 |
| 5,834,132 A | 11/1998 | Hasegawa et al. | |

OTHER PUBLICATIONS

F.J. Kurger, F. Bottcher, K. Brandt, U. Kohler, E. Niggemann, *Recent Advances in Battery Technology for Electric Vehicles*, EVS–13, The 13th International Electric Vehicle Symposium, Oct. 13–16, 1996, Osaka, Japan, pp. 85–90, Symposium Proceedings, vol. II.

W. Warthmann, G. Benczur–Urmossy, F. Haschka, D. Ohms, *High Power Alkaline Batteries in Fibre Technology for Hybrid Vehicles*, EVS–13, The 13th International Electric Vechicle Symposium, Oct. 13–16, 1996, Osaka, Japan, pp. 45–50, Symposium Proceedings, vol. II.

U. Koehler, F.J. Kruger, E. Niggemann, *Performance of Advanced Battery Systems*, The 14th International Seminar on Primary & Secondary Batteries, Mar. 10–13, 1997, Fort Lauderdale, Florida.

D.A. Corrigan, S. Venkatesan, A. Holland, P.R. Gifford, S.K. Dhar, S.R. Ovshinsky, *Ovonic Nickel–Metal Hydride Batteries for Electric Vehicles*, The 30th International Symposium on Automotive Technology and Automation, Jun. 1997, Florence, Italy.

U. Koher, J. Kuempers, M. Maul, E. Niggemann, *Battery Technology for Electric and Hybrid Vehicles*, The 30th International Symposium on Automotive Technology and Automation, Jun. 1997, Florence, Italy, pp. 589–596.

Uwe Koehler, Franz J. Kruger, Joerg Kuempers, Matthias Maul, Eberhard Niggemann, Herbert H. Schoenfelder, *High Performance Nickel–Metal Hydride and Lithium–Ion Batteries*, Proceedings of the Thirty–Second Intersociety Energy Conversion Engineering Conference, vol. 1, Aerospace Power Systems and Technologies, Jul. 27–Aug. 1, 1997, Honolulu, Hawaii, USA, pp. 93–98, vol. 1, Aerospace Power Systems and Technologies, American Institute of Chemical Engineers, New York, NY, USA.

U. Koehler, U. Jahn, E. Niggemann, *NiMH High Power Battery Development*, DOE Contractors Coordination Meeting, Oct. 1997, Dearborn, Michigan, USA, pp. 169–177.

* cited by examiner

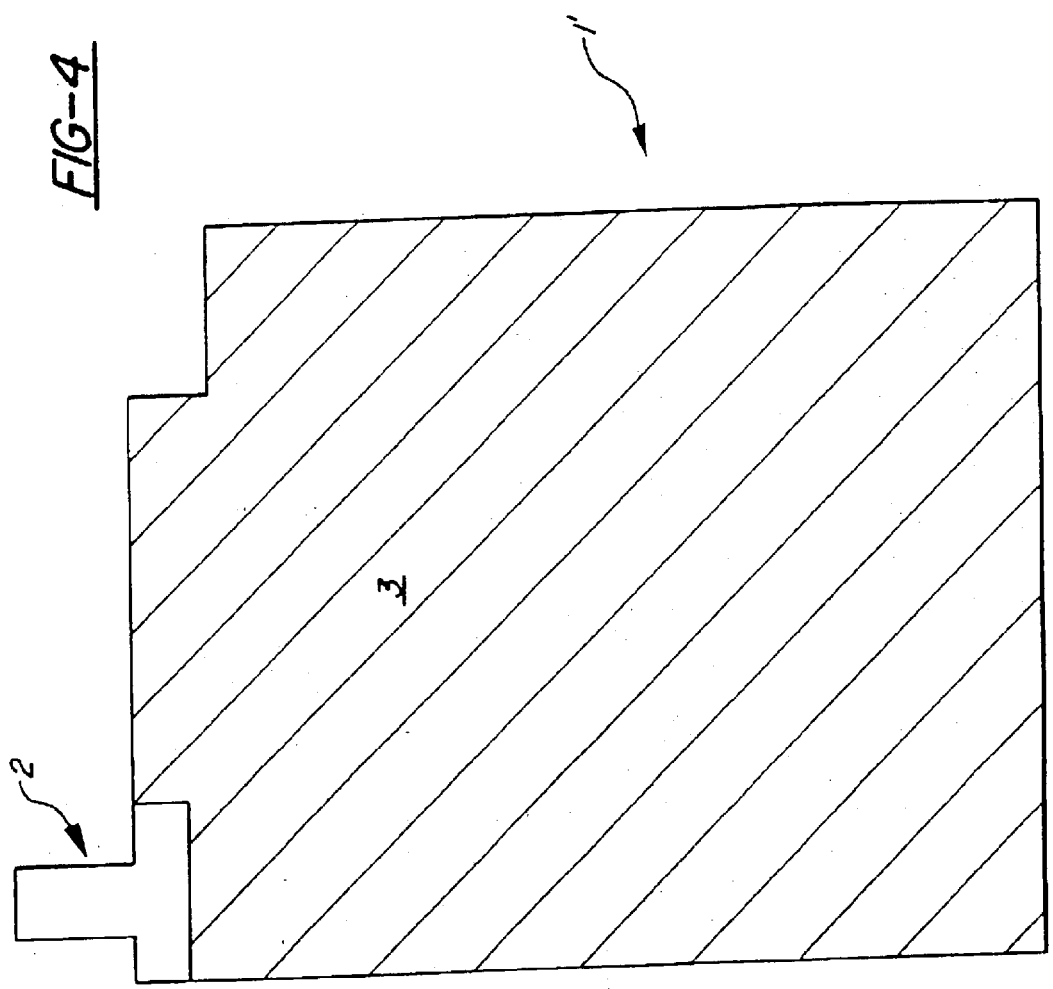

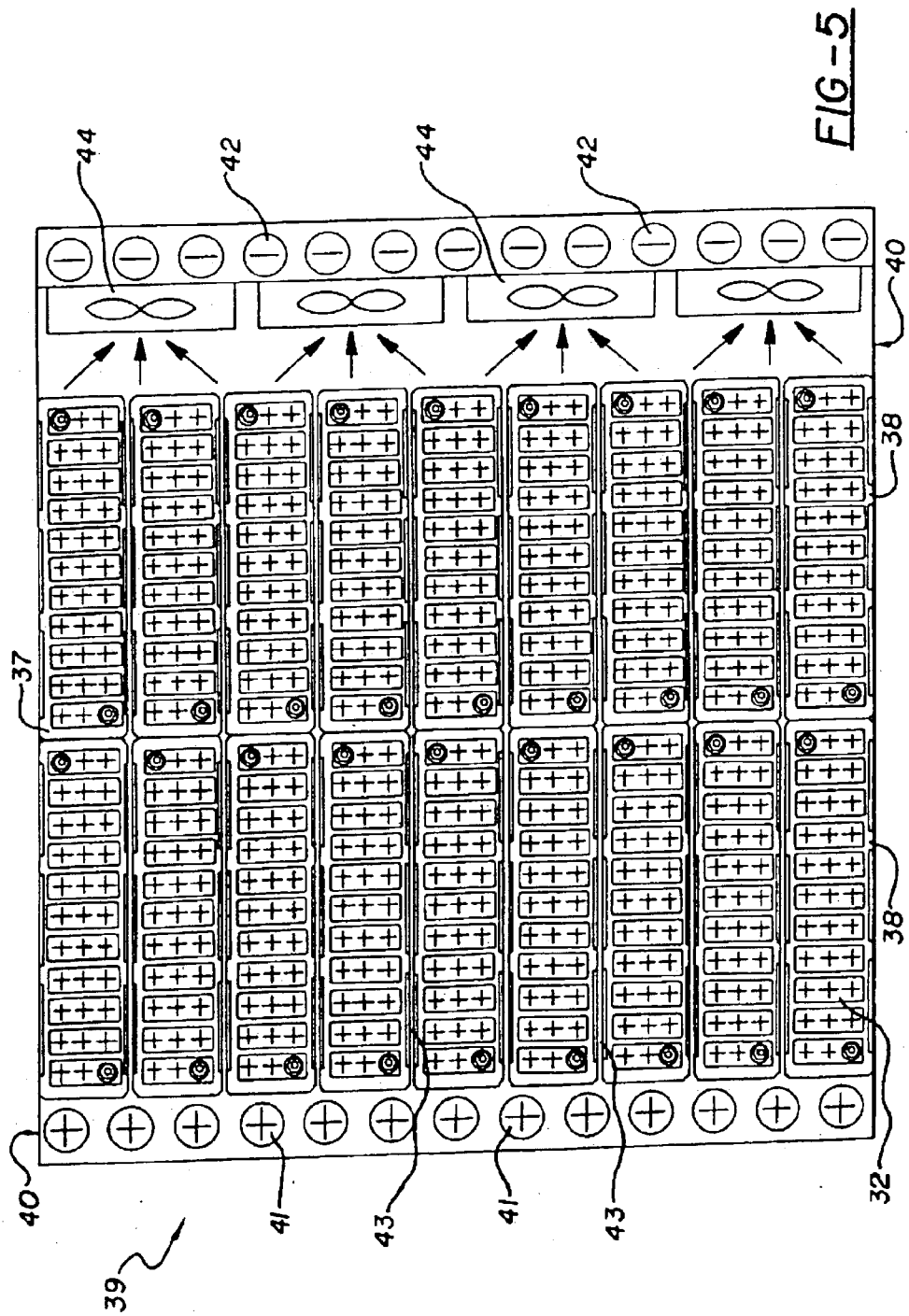

HYBRID ELECTRIC VEHICLE INCORPORATING AN INTEGRATED PROPULSION SYSTEM

RELATED APPLICATION INFORMATION

The present invention is a continuation of U.S. patent application Ser. No. 10/016,203 filed on Dec. 10, 2001 now U.S. Pat. No. 6,557,655, which is a continuation of U.S. patent application Ser. No. 08/979,340 filed on Nov. 24, 1997 now U.S. Pat. No. 6,330,925, which is a continuation-in-part of U.S. patent application Ser. No. 08/792,358 now U.S. Pat. No. 5,856,047 and Ser. No. 08/792,359, now U.S. Pat. No. 5,851,698 both filed Jan. 31, 1997.

FIELD OF THE INVENTION

The present invention relates generally to a hybrid electric vehicle incorporating an integrated propulsion system. More specifically, this integrated propulsion system comprises a combustion engine, an electric motor, high specific power, high energy density nickel-metal hydride (NiMH) batteries, and preferably a regenerative braking system. The NiMH batteries of the invention have negative electrodes with substrates of enhance current collecting capabilities, positive electrodes having enhance conductivity, and other improvements to enhance the power delivery capability of the battery and permit maximum operating efficiency during charge and discharge cycling while maintaining a combination of energy density and power density which provides enhanced performance beyond the capabilities of prior art NiMH battery systems.

BACKGROUND OF THE INVENTION

Advanced automotive battery development for vehicle propulsion has, in the past, been directed primarily at the requirement of fully electric propulsion systems for such vehicles. To this end, Stanford Ovshinsky and his battery development teams at Energy Conversion Devices, Inc. and Ovonic Battery Company have made great advances in nickel-metal hydride battery technology for such applications.

Initially effort focused on metal hydride alloys for forming the negative electrodes of such batteries. As a result of their efforts, they were able to greatly increase the reversible hydrogen storage characteristics required for efficient and economical battery applications, and produce batteries capable of high density energy storage, efficient reversibility, high electrical efficiency, efficient bulk hydrogen storage without structural changes or poisoning, long cycle life, and repeated deep discharge. The improved characteristics of these highly disordered "Ovonic" alloys, as they are now called, results from tailoring the local chemical order and hence the local structural order by the incorporation of selected modifier elements into a host matrix.

Disordered metal hydride alloys have a substantially increased density of catalytically active sites and storage sites compared to single or multi-phase compositionally homogeneous crystalline materials. These additional sites are responsible for improved efficiency of electrochemical charging/discharging and an increase in electrical energy storage capacity. The nature and number of storage sites can even be designed independently of the catalytically active sites. More specifically, these alloys are tailored to allow bulk storage of the dissociated hydrogen atoms at bonding strengths within the range of reversibility suitable for use in secondary battery applications.

Some extremely efficient electrochemical hydrogen storage materials were formulated, based on the disordered materials described above. These are the Ti—V—Zr—Ni type active materials such as disclosed in U.S. Pat. No. 4,551,400 ("the '400 Patent") to Sapru, Hong, Fetcenko, and Venkatesan, the disclosure of which is incorporated by reference. These materials reversibly form hydrides in order to store hydrogen. All the materials used in the '400 Patent utilize a generic Ti—V—Ni composition, where at least Ti, V, and Ni are present and may be modified with Cr, Zr, and Al. The materials of the '400 Patent are multiphase materials, which may contain, but are not limited to, one or more phases with $C_{14}$ and $C_{15}$ type crystal structures.

Other Ti—V—Zr—Ni alloys are also used for rechargeable hydrogen storage negative electrodes. One such family of materials are those described in U.S. Pat. No. 4,728,586 ("the '586 Patent") to Venkatesan, Reichman, and Fetcenko, the disclosure of which is incorporated by reference. The '586 Patent describes a specific sub-class of these Ti—V—Ni—Zr alloys comprising Ti, V, Zr, Ni, and a fifth component, Cr. The '586 Patent, mentions the possibility of additives and modifiers beyond the Ti, V, Zr, Ni, and Cr components of the alloys, and generally discusses specific additives and modifiers, the amounts and interactions of these modifiers, and the particular benefits that could be expected from them.

In contrast to the Ovonic alloys described above, the older alloys were generally considered "ordered" materials that had different chemistry, microstructure, and electrochemical characteristics. The performance of the early ordered materials was poor, but in the early 1980's, as the degree of modification increased (that is as the number and amount of elemental modifiers increased), their performance began to improve significantly. This is due as much to the disorder contributed by the modifiers as it is to their electrical and chemical properties. This evolution of alloys from a specific class of "ordered" materials to the current multicomponent, multiphase "disordered" alloys is shown in the following patents: (i) U.S. Pat. No. 3,874,928; (ii) U.S. Pat. No. 4,214,043; (iii) U.S. Pat. No. 4,107,395; (iv) U.S. Pat. No. 4,107,405; (v) U.S. Pat. No. 4,112,199; (vi) U.S. Pat. No. 4,125,688 (vii) U.S. Pat. No. 4,214,043; (viii) U.S. Pat. No. 4,216,274; (ix) U.S. Pat. No. 4,487,817; (x) U.S. Pat. No. 4,605,603; (xii). U.S. Pat. No. 4,696,873; and (xiii) U.S. Pat. No. 4,699,856. (These references are discussed extensively in U.S. Pat. No. 5,096,667 and this discussion is specifically incorporated by reference). Additional discussion is contained in the following U.S. patents, the contents of which are specifically incorporated by reference: U.S. Pat. Nos. 5,104,617; 5,238,756; 5,277,999; 5,407,761; 5,536,591; 5,506,069; and 5,554,456.

Ovshinsky and his teams next turned their attention to the positive electrode of the batteries. The positive electrodes today are typically pasted nickel electrodes, which consist of nickel hydroxide particles in contact with a conductive network or substrate, preferably having a high surface area. There have been several variants of these electrodes including the so-called plastic-bonded nickel electrodes which utilize graphite as a microconductor and also including the so-called foam-metal electrodes which utilize high porosity nickel foam as a substrate loaded with spherical nickel hydroxide particles and cobalt conductivity enhancing additives. Pasted electrodes of the foam-metal type have started to penetrate the consumer market due to their low cost and higher energy density relative to sintered nickel electrodes.

Conventionally, the nickel battery electrode reaction has been considered to be a one electron process involving oxidation of divalent nickel hydroxide to trivalent nickel oxyhydroxide on charge and subsequent discharge of trivalent nickel oxyhydroxide to divalent nickel hydroxide. However, quadrivalent nickel is also involved in the nickel hydroxide redox reaction, the utilization of which has never been investigated.

In practice, electrode capacity beyond the one-electron transfer theoretical capacity is not usually observed. One reason for this is incomplete utilization of the active material due to electrical isolation of oxidized material. Because reduced nickel hydroxide material has high electrical resistance, the reduction of nickel hydroxide adjacent the current collector forms a less conductive surface that interferes with the subsequent reduction of oxidized active material that is farther away.

Ovonic Battery Company has developed positive electrode materials that have demonstrated reliable transfer of more than one electron per nickel atom. Such stable, disordered positive electrode materials are described in U.S. Pat. Nos. 5,344,728; 5,348,822; 5,523,182; 5,569,563; and 5,567,599; the contents of which are specifically incorporated by reference.

As a result of this research into the negative and positive electrode active materials, the Ovonic Nickel Metal Hydride (NiMH) battery has reached an advanced stage of development for EVs. Ovonic electric vehicle batteries are capable of propelling an electric vehicle to over 370 miles (due to a specific energy of about 90 Wh/Kg), long cycle life (over 1000 cycles at 80% DOD), abuse tolerance, and rapid recharge capability (up to 60% in 15 minutes). Additionally, the Ovonic battery has demonstrated higher power density when evaluated for use as an EV stored energy source.

As an alternative to true electric vehicles, hybrid-electric vehicles (HEVs) have gained popularity as having the technical capability to meet the goal of tripling auto fuel economy in the next decade. Hybrid electric vehicles utilize the combination of a combustion engine and an electric motor driven from a battery and have been proposed in a variety of configurations.

Hybrid systems have been divided into two broad categories, namely series and parallel systems. In a typical series system, an electric propulsion motor is used to drive the vehicle and the engine is used to recharge the battery. In the parallel system, both the combustion engine and the electric motor are used to drive the vehicle and can operate in parallel for this purpose.

There are further variations within these two broad categories. For example, there are systems which employ a combination of the series and parallel systems. In the so-called "dual mode" system, the propulsion mode can be selected, either by the operator or by a computer system, as either an "all electric" or "all engine" mode of propulsion. In the "range extender" system, a primarily electric system is used for propulsion and the engine is used for peak loads and/or for recharging the battery. In the "power assist" system, peak loads are handled by the battery driven electric motor.

A further division is made between systems which are "charge depleting" in the one case and "charge sustaining" in another case. In the charge depleting system, the battery charge is gradually depleted during use of the system and the battery thus has to be recharged periodically from an external power source, such as by means of connection to public utility power. In the charge sustaining system, the battery is recharged during use in the vehicle, through regenerative braking and also by means of electric power supplied from a generator driven by the engine so that the charge of the battery is maintained during operation.

There are many different types of systems that fall within the categories of "charge depleting" and "charge sustaining" and there are thus a number of variations within the foregoing examples which have been simplified for purposes of a general explanation of the different types. However, it is to be noted in general that systems which are of the "charge depleting" type typically require a battery which has a higher charge capacity (and thus a higher specific energy) than those which are of the "charge sustaining" type if a commercially acceptable driving range (miles between recharge) is to be attained in operation. Further and more specific discussion of the various types of HEV systems, including "series", "parallel" and "dual mode" types, and of the present invention embodied in such systems will be presented below.

In the present application, the phrase "combustion engine" is used to refer to engines running off of any known fuel, be it hydrogen or hydrocarbon based such as gasoline, alcohol, or natural gas, in any combination.

The use of hybrid drive systems offers critical advantages for both fuel economy and ultra-low emissions. Combustion engines achieve maximum efficiency and minimal emissions when operated at or near the design point speed and load conditions. Small electric motors are capable of providing very high peak torque and power. Thus, the ability to use a small combustion engine operating at maximum efficiency coupled with an electric motor operating at maximum efficiency offers an outstanding combination for minimizing emissions, providing excellent fuel economy, and maximizing acceleration.

A key enabling requirement for HEV systems is an energy storage system capable of providing very high peak power combined with high energy density while at the same time accepting high regenerative braking currents at very high efficiency. In addition, the duty cycle of a peak power application requires exceptional cycle life at low depths of discharge, particularly in charge depleting systems.

It is important to understand the different requirements for this energy storage system compared to those for a pure electric vehicle. Range is the critical factor for a practical EV, making energy density the critical evaluation parameter. Power and cycle life are certainly important, but they are secondary to energy density for an EV. A lightweight, compact, high-capacity battery is the target for pure EV applications.

In contrast, in HEV applications, gravimetric and volumetric power density is the overwhelming consideration. Excellent cycle life from 30 to 60% DOD is also more critical than cycle life at 80% DOD as required in EV applications. Similarly, rapid recharge is also essential to allow efficient regenerative braking, and charge/discharge efficiency is critical to maintain battery state of charge in the absence of external charging. In addition, thermal management and excellent gas recombination are important secondary considerations to rapid recharging and multiple cycling.

Heat generated during charging and discharging NiMH batteries is normally not a problem in small consumer batteries or even in larger batteries when they are used singly for a limited period of time. On the other hand, batteries used in HEVs will be subjected to many rapid charge and discharge cycles during normal operation. Such rapid charging and discharging will result in significant thermal swings that can affect the battery performance. The prior art suggests a variety of solutions to this problem, such as the following:

U.S. Pat. No. 4,115,630 to Van Ommering, et al., describes a metal oxide-hydrogen battery having bipolar electrodes arranged in a centrally drilled stack. This patent describes conducting heat generated in the electrode stack via the hydrogen gas of the cell. In particular, the application notes that because heat conduction perpendicular to electrode plates is 10–20 times smaller than conduction parallel to electrode plates, cells using flat electrodes must be modified significantly which makes them unacceptably heavy.

J. Lee, et al. describe resistive heating and entropy heating in lead-acid and nickel/iron battery modules in 133(7) JESOAN 1286 (July, 1986). This article states that the temperature of these batteries is due to resistive heating and entropy changes of the electrochemical reactions often varies considerably during their operation. They note that the thermal resistance caused by the cell case plays an important role as the cell temperature becomes higher. This reference suggests that some additional cooling structure must be added to the battery.

U.S. Pat. No. 4,865,928 to Richter describes a method of removing heat from the interior of a high-performance lead acid battery by attaching a U-shaped tube to the negative electrode grid and circulating a coolant through the tube.

U.S. Pat. No. 5,035,964 to Levinson, et al., describe attaching a finned heat sink to a battery and positioned the combination in a chimney structure. The finned heat sink produces a convective flow of air in the chimney to cool the battery and extend its life.

All of the above cited references suggest methods of removing heat that requires the addition of auxiliary apparatus to the battery pack. None suggest how this can be accomplished without modifications that, as U.S. Pat. No. 4,115,630 specifically states, result in an unacceptable addition to the total weight of the cell.

In all sealed cells, the discharge capacity of a nickel based positive electrode is limited by the amount of electrolyte, the amount of active material, and charging efficiency. The charge capacity of a NiMH negative electrode is limited by the amount of active material used, since its charge efficiency is very high, nearly a full state of charge is reached. To maintain the optimum capacity for a metal hydride electrode, precautions must be taken to avoid oxygen recombination or hydrogen evolution before full charge is reached. This becomes a critical problem for batteries in any HEV system that undergo repetitive charge and discharge cycles. The problem of venting is not new and many manufacturers have attempted to solve it. Typically the solution has involved the use of a gas consumption electrode (GCE). Typical GCEs are carbon, copper, silver, or platinum prepared in a porous form to provide a large surface area for gas recombination is the site of catalytic oxygen reduction.

U.S. Pat. No. 5,122,426 describes a GCE that has three distinct layers, a hydrophobic electrically nonconductive first layer, a hydrophilic second layer, and a hydrophobic third layer. This third layer is electrically connected to the negative electrode.

Similarly, U.S. Pat. No. 5,128,219 describes a gas consumption electrode comprising a metallic component, such as Pd, Ni, or Cu, and a film of activated carbon, carbon black, and a binder. Use of the described GCE is particularly discussed in a button cell.

While many GCEs are very efficient, their presence decreases the area available for active electrodes and hence decreases the overall volumetric energy density of the cell. In cells of an HEV system like all sealed NiMH cells, it is desirable to keep pressures within acceptable limitations without the necessity of using a GCE.

The foregoing are just a few examples of the differences in battery requirements for EV applications and HEV applications. There are also many other differences depending upon the particular type of HEV system employed. These will be discussed later in connection with particular HEV systems. Given the fundamental differences in requirements between the EV and those for an HEV application, it could be expected that those batteries currently optimized for use in EV applications will generally not be suitable for HEV without increasing power density. While the demonstrated performance of Ovonic EV batteries has been impressive, these cell and battery designs have been optimized for use in pure EVs and therefore do not meet the specific requirements for HEVs.

SUMMARY OF THE INVENTION

An object of the present invention is a power system for a hybrid vehicle comprising NiMH batteries having high peak power combined with high energy density and excellent cycle life at low depths of discharge. In particular, the present invention provides high peak power in combination with high energy density, a combination which the prior art has been unable to provide, as will be explained.

Another object of the present invention is a power system for a hybrid vehicle comprising Ovonic NiNM batteries having high power combined with high energy density, excellent low depth of discharge cycle life, good thermal management, and excellent gas recombination.

These and other aspects of the present invention are satisfied by a hybrid electric vehicle drive system comprising a combustion engine, an electric motor and at least one nickel metal hydride battery module for powering the electric motor, the at least one nickel metal hydride battery module having a peak power density in relation to energy density as defined by the following expression:

$$P > 1{,}375 - 15E$$

where P is the peak power density as measured in Watts/kilogram and E is the energy density as measured in Watt-hours/kilogram.

Other aspects of the present invention are satisfied by a hybrid electric vehicle incorporating an integrated propulsion system, comprising: a power system comprising a combustion engine and an electric motor, nickel metal hydride batteries configured for maximum power and coupled to the power system, and power controlling means governing the series and/or parallel operation of the combustion engine and the electric motor at maximum efficiency for powering the hybrid electric vehicle and providing for the charge and discharge of the nickel metal hydride batteries. Additionally, a regenerative braking system may be coupled to the power controlling means and to provide additional charging current for the nickel metal hydride batteries.

Other aspects of the battery are satisfied by the integrated propulsion system described above, where the nickel-metal hydride batteries have negative and/or positive electrodes comprising: powdered active materials pressed into a porous metal substrate selected from the group consisting of copper, copper alloy, nickel coated with copper, and nickel coated with copper alloy. Additionally, the substrate may be plated with material that is electrically conductive and corrosion resistant.

Other aspects of the battery are satisfied by the integrated propulsion system described above, where the porous metal substrate is fabricated with current collection lines having electrical conductivity greater than the porous metal substrate, the current collection lines providing high conductivity pathways from points remote from the current collecting tab on the negative and positive electrodes. To further increase the conductivity between the components of the battery of the invention and increase power, the current collecting tab may be laser welded to themselves as well as to the terminals.

Other aspects of the battery are satisfied by the integrated propulsion system described above, where the nickel metal hydride batteries are low pressure nickel metal hydride electrochemical cells.

BRIEF DESCRIPTION OF THE DRAWINGS

FIG. 4 is a planar illustration of an electrode for a prismatic Ni-MH battery with an attached electrode tab.

FIG. 5 is a stylized depiction of a top view of one embodiment of the fluid-cooled nickel metal hydride battery pack adopted for HEV uses of the present invention.

DETAILED DESCRIPTION OF THE INVENTION

Nickel-metal hydride batteries of the present invention are adapted to provide increased specific power and recharge rates that are particularly advantageous in HEV applications. These characteristics are provided while maintaining a high energy density. This is accomplished in the present invention through, inter alia, the use of positive and negative electrodes having increased internal conductance. Such electrodes are formed by pressing powdered metal-hydride active materials into highly conductive porous metal substrates. These porous metal substrates are formed from copper, a copper alloy, or nickel coated with copper or a copper alloy. Additionally, the substrate may be plated with a material that is electrically conductive and will prevent corrosion of the metal substrate in the battery environment, such as nickel.

Figure 1:
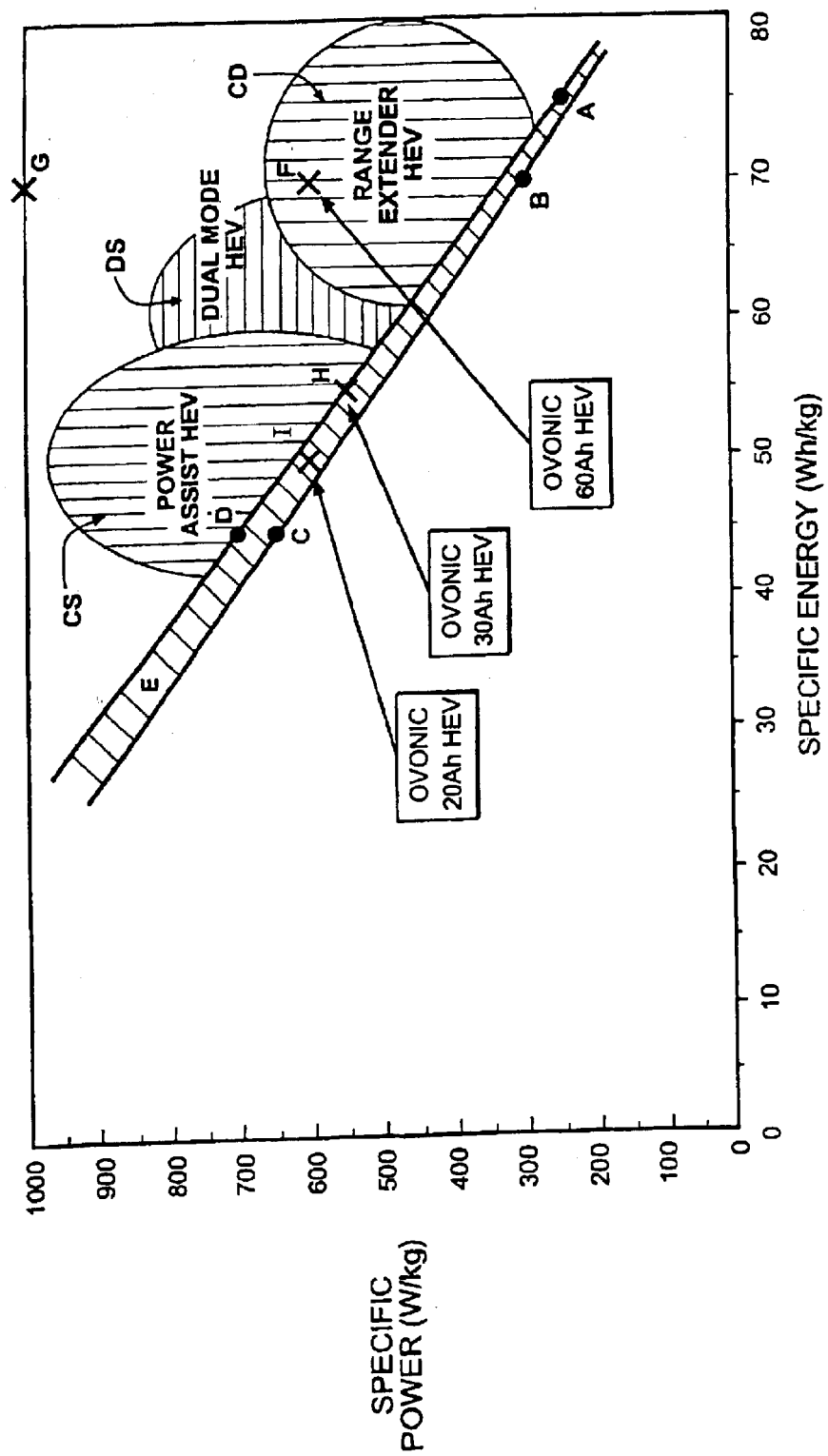
FIG. 1 is a graphical depiction of the relationship between peak power output and energy density of typical prior art nickel metal hydride batteries in comparison to the performance of the Ovonic nickel metal hydride batteries of the present invention for various HEV applications.

With reference to FIG. 1, prior art NiMH batteries designed for use in HEV applications have shown a maximum attainable energy density of about 75 Wh/Kg while providing a peak power density capability of about 250 W/Kg. This combination of energy density and peak power density is shown at point A in FIG. 1. Allowing for some minor engineering improvements, the peak power density attainable with prior art NiMH batteries at this energy density might be increased to about 300 W/Kg with an energy density of about 70 Wh/Kg, which is shown at point B in FIG. 1. In order to increase the peak power density of such prior art batteries for use in HEV systems, it is necessary to sacrifice energy density as a trade off in order to attain a higher peak power density. This, in turn, decreases the energy density of the battery so that, for example, as the peak power density is increased from. 250 W/Kg to about 650 W/Kg for better HEV performance, the energy density is decreased from about 70 Wh/Kg to about 45 Wh/Kg, as shown at point C in FIG. 1. Again, allowing for some engineering improvement, the peak power density attainable at 45 Wh/Kg might be increased to about 700 W/Kg, which is point D in FIG. 1.

These points A, B, C and D define a band E which represents the upper limit of the region (which region defines combinations of both high power density and high energy density) attainable with prior art NiMH batteries for use in HEV systems. The present invention provides improved performance in the region yielding a unique combination of both higher power density and higher energy density than has been possible to attain in battery modules adapted for use in HEV applications.

Taking the upper limits of the shaded band E of FIG. 1, the upper limit of peak power P density attainable for a selected given energy density E of prior art NiMH battery modules for use in HEV applications can therefore be represented by the following equation:

$$P = 1{,}375 - 15E \qquad \text{Equation (1)}$$

where P is the maximum available peak power density (measured in W/Kg) attainable for a given energy density E (measured in Wh/Kg). The present invention permits operation of HEV systems of all types at peak power density levels in relation to energy density in the region that lies beyond these limits of the existing prior art, that is at levels higher than those defined by the above equation (1).

For example, a battery module embodying the present invention and having an energy density of about 70 Wh/Kg typically exhibits a peak power density of at least 600 W/Kg (shown at point F in FIG. 1) and can have a peak power density as high as 1,000 W/Kg (shown at point G in FIG. 1). These points establish a band of peak power to energy density relationships particularly suited to BEV applications and which are substantially beyond the capability of prior art NiMH batteries.

To give specific examples, an Ovonic 60 Ah HEV battery having an energy density of about 70 Wh/Kg provides a peak power of about 600 W/Kg. This is the example shown at point F in FIG. 1. In another example, an Ovonic 30 Ah HEV battery having an energy density of about 55 Wh/Kg provides a peak power of about 550 W/Kg. This example is shown at point H in FIG. 1. In a third example, an Ovonic 20 Ah HEV battery having an energy density of about 50 Wh/Kg provides a peak power of about 600 W/Kg. This example is shown at point I in FIG. 1.

Figure 2:
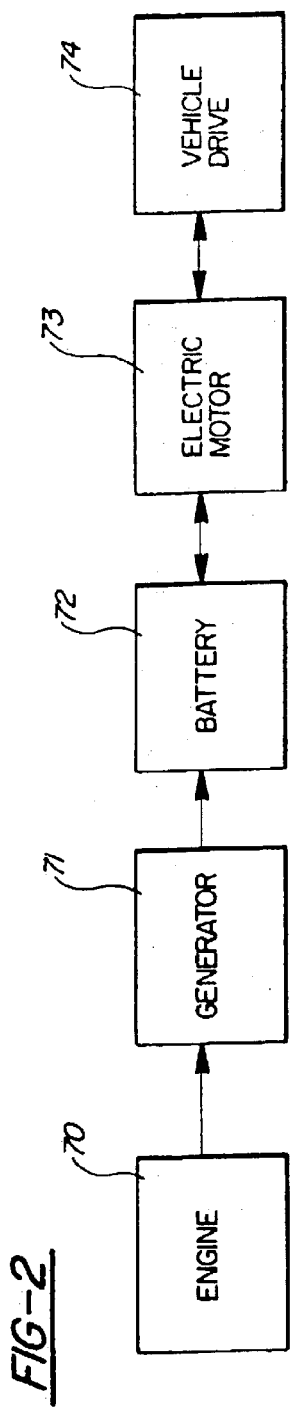
FIG. 2 is a schematic representation of a series BEV system in which the present invention can be embodied; specifically illustrated is the matrix placement of the battery modules into the pack case, the manner in which the module spacers form coolant flow channels, fluid inlet and outlet ports, and fluid transport means.
Figure 3:
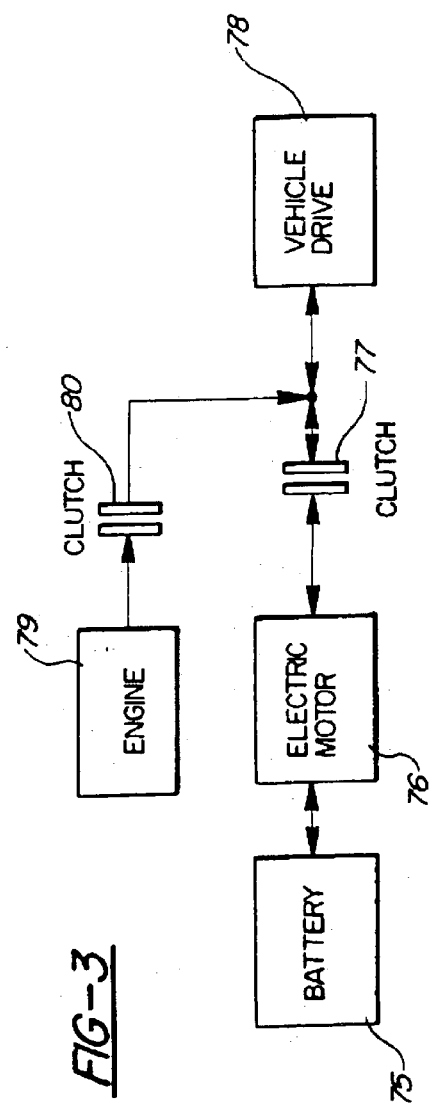
FIG. 3 is a schematic representation of a parallel HEV system in which the present invention can be embodied.

Representative HEV systems in which the present invention is applicable are shown in schematic form in FIGS. 2 and 3. FIG. 2 shows a series HEV system in which a combustion engine 70 is connected to drive a generator 71. The generator 71 is in turn connected to charge a battery 72 which supplies electrical power to a drive motor 73. The drive motor 73 is connected to the vehicle drive system 74 which supplies drive power to the vehicle wheels.

The battery may be initially charged from a separate power source such as through an outlet connected to a public utility system. The battery 72 is also recharged to some extent by regenerative braking during deceleration.

In the parallel type of system as shown in FIG. 3, a battery 75 is connected to supply electrical power to an electric drive motor 76 which is connectible through a clutch 77 to vehicle drive system 78. Connected in parallel with the electric drive path formed by the battery 75, the motor 76 and the clutch 77 is a combustion engine 79 which is also connectible to the vehicle drive system 78. The vehicle can driven by either the electric motor 76 when the clutch 77 alone is engaged or by the engine 79 when the clutch 80 alone is engaged, or by both the motor 76 and the engine 79 simultaneously when both clutches 77 and 80 are engaged at the same time.

In the parallel system as shown in FIG. 3, the combustion engine 79 may be sized much smaller than would otherwise be required to provide acceptable vehicle acceleration characteristics because the electric motor 76 can be engaged along with the engine 79 to provide the desired acceleration. This means that, if the combustion engine is used for the primary drive mode, it can be operated at a much improved efficiency under steady state load and speed conditions.

Various combinations of the electric motor 76 and the combustion engine 79 are employed in parallel type systems. For example, in one system intended for use in city environments, vehicle propulsion is provided by the electric motor 76 alone when the vehicle is operated within the city. Outside of the city, the combustion engine 79 may be used for propulsion purposes. Various other combinations are also employed using the parallel type of connection as shown in FIG. 3.

Parallel type systems such as shown in FIG. 3 are also operated in either the charge sustaining or charge depleting mode as explained above. As shown in the diagram of FIG. 3, generative power feedback during regenerative braking. Other connections (not shown) can also be provided to permit the combustion engine 79 to provide recharging power to the battery 75 to implement a charge sustaining mode of operation.

For example, in the so-called "series-parallel" or "compound" HEV system, sometimes referred to as a "dual mode" system, a power splitter is used to take off some of the power from the combustion engine to drive a generator which provides recharging power to the battery.

FIG. 1 has been divided into sectors depicting those regions in which the various forms of HEV systems would be operated. In the region CD, for example, systems which are of the charge depleting type would typically be operated. This is because the battery is not recharged during operation and the emphasis will thus be on a high energy density for maximum range. This region is also referred to as the "range extender" region.

For the case of charge sustaining systems, where the battery is recharged during operation, a lower energy density is accepted and the emphasis is on a higher peak power for improved performance with a lower energy density being accepted as a trade off for increase in power density. This region is designated CS in the diagram of FIG. 1. This region is also referred to as the "power assist" region.

Compound or dual mode systems would be operated in the region DS in between the regions CD and CS as shown in FIG. 1.

The parameter of peak power is determined in accordance with standards established by the United States Advanced Battery Consortium (USABC). According to these standards, peak power is measured with the battery module discharged to 50% depth of discharge. At this condition a current and corresponding power output which reduces the voltage of the battery to $\frac{2}{3}$ of its open circuit voltage held for a period of ten seconds is the peak power rating of the battery. This determination is made under normal temperature conditions in the range of about 30 to 35° C.

The energy density or specific energy E is measured for the battery module as designed for use in HEV applications. This determination is also made under normal temperature conditions in the range of about 30 to 35° C.

A battery module is an integral assembly of cells connected together and encased in a casing and having external electrical connections for connection to an external circuit or load.

As noted above, the present invention enables operation in the higher performance region above the band E for all HEV system types, i.e., charge depleting, charge sustaining and dual operation. Prior art NiMH battery systems for HEV applications are unable to provide performance in this enhanced performance region.

The power controlling means of the present invention that governs operation of the combustion engine and the electric motor at maximum efficiency of said nickel metal hydride batteries can be any known control device. Preferably, the power controlling means is a solid state integrated microelectronic device including AI algorithms that incorporate appropriate sensors and self-regulating and self-adjusting sub-routines. These permit constant adjustment of control parameters to attain maximum efficiency based on numerous external factors such as type of driving, average driving speed, ambient temperature, etc., as well as system factors such as engine temperatures, charge/discharge times and rates, battery temperatures, fuel consumption, etc.

The electrodes can also include current collection lines on the substrate. Such current, collection lines have a higher electrical conductivity than the remainder of the substrate. This configuration assures high conductivity pathways from points remote from the current collecting tab on the electrode to the current collection tab. One embodiment of the current collection line comprises densifying portions of the porous metal substrate. Another embodiment comprises wires, ribbons or sintered powder electrically attached or embedded into the porous metal substrate. These attached or embedded components can be formed from nickel, copper, a copper alloy, nickel coated with copper or a copper alloy, or a copper material coated nickel.

A primary consideration of the present invention involves improving the power output of an Ovonic nickel-metal hydride (NiMH) rechargeable battery. (While reference is made specifically to Ovonic NiMH batteries, the principles described herein are applicable to all types of metal hydride battery systems regardless of their designation.) Generally, power output may be increased by lowering the internal resistance of the battery. Lowering the internal resistance decreases the power wasted due to heat dissipation within the battery, thereby increasing the power which is available to drive external loads. The internal resistance of a nickel-metal hydride battery can be decreased by increasing the conductivity of the battery components as well as the connections between the components. More specifically, the internal resistance can be decreased by increasing the conductivity of both the positive and negative electrodes of the battery.

The volumetric peak power density of the batteries of the present invention is generally $\geq 1500$ W/L, preferably $\geq 1800$ W/L, and most preferably $\geq 2700$ W/L. The specific peak power density of batteries of the present invention is generally >600 W/kg, preferably $\geq 700$ W/kg, and most preferably $\geq 1000$ W/kg. In batteries of the present invention, it is usually necessary to sacrifice energy density in favor of power density. With this in mind, the volumetric peak energy density of the batteries of the present invention is generally between 130–250 Wh/L, preferably $\geq 150$ Wh/L, and most preferably $\geq 160$ Wh/L.

In general, NiMH batteries employ a negative electrode having an active material that is capable of reversible electrochemical storage of hydrogen. Upon application of an electrical potential across a NiMH battery, the active negative electrode material is charged by the electrochemical absorption of hydrogen and the electrochemical generation of hydroxyl ions. The electrochemical reaction at the negative electrode is as follows:

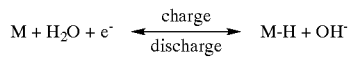

The negative electrode reactions are reversible. Upon discharge, the stored hydrogen is released to form a water molecule and release an electron.

The negative electrodes of a nickel-metal hydride battery are generally formed by pressing powdered active material into a porous metal substrate. As discussed, the powdered active material of the negative electrode is a hydrogen storage material. The hydrogen storage material may be chosen from the Ti—V—Zr—Ni active materials such as those disclosed in U.S. Pat. No. 4,551,400 ("the '400 Patent"), the disclosure of which is incorporated by reference. As discussed above, the materials used in the '400 Patent utilize a generic Ti—V—Ni composition, where at least Ti, V, and Ni are present with at least one or more of Cr, Zr, and Al. The materials of the '400 Patent are multiphase materials, which may contain, but are not limited to, one or more phases with $C_{14}$ and $C_{15}$ type crystal structures.

There are other Ti—V—Zr—Ni alloys which may also be used for the hydrogen storage material of the negative electrode. One family of materials are those described in U.S. Pat. No. 4,728,586 ("the '586 Patent"), the disclosure of which is incorporated by reference. The '586 Patent discloses a specific sub-class of these Ti—V—Ni—Zr alloys comprising T, V, Zr, Ni, and a fifth component, Cr. The '586 Patent mentions the possibility of additives and modifiers beyond the T, V, Zr, Ni, and Cr components of the alloys, and generally discusses specific additives and modifiers, the amounts and interactions of the modifiers, and the particular benefits that could be expected from them.

In addition to the materials described above, hydrogen storage materials for the negative electrode of a NiMH battery may also be chosen from the disordered metal hydride alloy materials that are described in detail in U.S. Pat. No. 5,277,999 ("the '999 Patent"), to Ovshinsky and Fetcenko, the disclosure of which is incorporated by reference.

As stated above, the active hydrogen storage material is compressed onto a porous metal substrate. Generally, the porous metal substrate, includes, but is not limited to, mesh, grid, matte, foil, foam and plate. Preferably, the porous metal substrate used for the negative electrode is a mesh or grid. The present invention includes nickel metal hydride batteries having negative and positive electrodes that comprise a porous metal substrate formed from one or more materials selected from the group consisting of copper, copper alloy, nickel coated with copper, nickel coated with copper alloy, and mixtures thereof. Preferably, the porous metal substrate is formed from copper or copper alloy.

Alkaline batteries represent an extremely harsh operating environment. In order to protect the electrodes from the harsh environment within the battery, the porous metal substrate formed from the materials describe above may be plated with a material that is electrically conductive yet resistant to corrosion in the battery environment. Examples of materials that can be used to plate the negative electrode include, but are not limited to, nickel and nickel alloy.

Using copper or copper alloy to form the porous metal substrate of the negative electrode has several important advantages. Copper is an excellent electrical conductor. Hence, its use as a substrate material decreases the resistance of the negative electrode. This decreases the amount of battery power wasted due to internal dissipation, and thereby provides a NiMH battery having increased output power.

Copper is also a malleable metal. Malleability is very important because of the expansion and contraction of the negative electrodes during charge and discharge cycling of a NiMH battery. The increased pliability of the substrate helps prevent electrode breakage as a result of the expansion and contraction, thereby resulting in improved battery reliability. Further, copper has excellent thermo-conductivity. Of itself, this fact aids in the temperature management of the batteries of the invention. And copper's thermo-conductivity tends to further enhance the thermo-conductive aspects of the invention described below.

Increased substrate malleability also means that the substrate can more reliably hold the active hydrogen storage material that is compressed onto the substrate surface, thereby improving battery reliability. This also lessens the need to sinter the negative electrodes after the storage material is compressed onto the substrate surface, thereby reducing the cost and increasing the speed in which the electrodes are made.

Another way to increase the power output from a nickel-metal hydride battery is to increase the conductivity of the battery's positive electrodes. As in the case of the negative electrodes, this can be done by appropriately altering the materials from which certain electrode components are made.

Generally, the positive electrode of the nickel-metal hydride battery is formed by pressing a powdered active positive electrode material into a porous metal substrate. NiMH batteries generally employ a positive electrode having nickel hydroxide as the active material. The reactions that take place at the positive electrode are as follows:

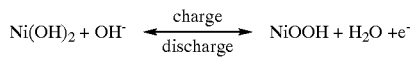

The nickel hydroxide positive electrode is described in U.S. Pat. Nos. 5,344,728 and 5,348,822 (which describe stabilized disordered positive electrode materials) and U.S. Pat. No. 5,569,563 and U.S. Pat. No. 5,567,549 the disclosures of which are incorporated by reference.

The porous metal substrate of the positive electrode includes, but is not limited to, mesh, grid, matte, foil, foam and plate. Disclosed herein, is a positive electrode comprising a porous metal substrate that is formed from one or more materials selected from the group consisting of copper, copper alloy, nickel coated with copper, nickel coated with a copper alloy, and mixtures thereof. Forming the substrate from one or more of these materials increases the conductivity of the positive electrodes of the battery. This decreases the amount of power wasted due to internal power dissipation, and thereby increases the power output of the NiMH battery.

To protect the positive electrode from the harsh battery environment, the porous metal substrate may be plated with a material which is electrically conductive yet resistant to corrosion in the battery environment. Preferably, the porous metal substrate may be plated with nickel for protection.

The conductivity of the positive electrode may be increased in other ways. The conductivity of the positive electrode can be increased by introducing lines of higher electrical conductivity into the porous metal substrate. These "current collection lines" are formed so as to have a higher electrical conductivity than the remainder of the substrate and thus provide high conductivity pathways from points remote from the current collection tabs of the positive electrodes.

An embodiment of a positive electrode comprising current collection lines is shown in FIG. 4. As shown in FIG. 4, attached to the positive electrode 1 is a current collecting tab 2. Generally, the current collecting tab 2 is attached to at least one point of the positive electrode attached along the top of the positive electrodes so that they may be easily connected to the positive battery terminal of the nickel-metal hydride battery. The current collecting tab 2 may be formed of any electrically conducting material which is resistant to corrosion from the battery environment. Preferably, the current collecting tab 2 may be formed of nickel, nickel-plated copper, or nickel-plated copper alloy. Forming the current collecting tab 2 from either nickel-plated copper or nickel-plated copper alloy rather than from nickel decreases the resistance of the tab and increases the power output from the battery. Tabs formed from either nickel-plated copper or nickel-plated copper alloy may be connected to the battery terminal via laser welding.

As described, the current collecting lines provide high conductivity pathways from points remote from the current collection tabs. The current collection lines may be configured in many different ways. Preferably, the current collection lines are configured to minimize the resistance of the positive electrodes and allow the current flowing in the electrode to reach the collecting tabs with minimal loss of power. Because the current collection lines provide high conductivity pathways for the current, the overall conductivity of the positive electrodes is increased, thereby reducing the waste of internal power dissipation and increasing the power output of the battery. One embodiment of a configuration of the current collection lines is shown in FIG. 4, where the current collecting lines 3 traverse the positive electrode.

The current collection lines are formed in a porous metal substrate which, as discussed above, includes, but is not limited to, mesh, grid, matte, foil, foam and plate. Preferably, the porous metal substrate is formed from foam. More preferably, the porous metal substrate is formed from nickel foam or nickel plated copper foam.

The current collection lines may be implemented in many different ways. In one embodiment, the current collection lines comprise densified portions of the porous metal substrate. The densified portions of the material are more conductive than the remainder of the material. When the substrate is comprised of foam, the current collection lines can be formed (i.e. the material densified) by compressing the appropriate portions of the foam.

In yet another embodiment, the current collection lines may be formed by conductive powder which is sintered to the porous substrate in the appropriate configuration. The powder may be formed from one or more materials selected from the group consisting of copper, copper alloy, nickel-plated copper, nickel-plated copper alloy, nickel, nickel coated with copper, and nickel coated with copper alloy, and mixtures thereof.

Alternately, in another embodiment, the current collection lines may be formed by first forming densified portions or channels in the porous substrate, and then integrating the conductive wire, ribbon or powder into these densified portions or channels.

In other embodiments, the current collection lines are formed by conductive wires and ribbons that are electrically connected to the substrate and appropriately placed to minimize the resistance of the electrodes. The wires or ribbons may be formed from one or more materials selected from the group consisting of copper, copper alloy, nickel-plated copper, nickel-plated copper alloy, nickel, nickel coated with copper, and nickel coated with copper alloy, and mixtures thereof.

In another embodiment of the present invention, the conductivity of the positive electrodes is further enhanced by the addition of conductive additives added to the nickel hydroxide active electrode material. Such current conducting additives are chosen from the group consisting of nickel particles, nickel fibers, graphite particles, nickel plated graphite particles, nickel plated copper particles, nickel plated copper fibers, nickel flakes, and nickel plated copper flakes.

Another aspect of this invention is a nickel-metal hydride battery having at least one positive electrode of the type disclosed herein. And yet another aspect of this invention is a nickel-metal hydride battery having at least one negative electrode of the type disclosed herein.

In all batteries, heating occurs during charging and discharging. Because internal resistance in NiMH batteries is low, less heat is generated than in many prior art types of batteries. Recent experimental data indicates that during overcharge the heat generated by the recombination of oxygen, while not significant in small consumer batteries, could become a problem the batteries of the HEV system described herein.

Heat would become a particular problem in sealed NiMH batteries having pasted electrodes and a plastic case in an HEV system application. Recent analysis using a pasted electrode and a plastic case has shown that the heat generated during overcharge is essentially trapped in the cell where temperatures can reach 80° C. In NiMH batteries, excessive heat decreases performance and decreases cell life due to separator and seal degradation as well as accelerated degradation of the nickel hydroxide and metal hydride active materials.

Many NiMH batteries currently on the market use pasted metal hydride electrodes in order to achieve sufficient gas recombination rates and to protect the base alloy from oxidation and corrosion. The pasted electrode typically mixes the active material powder with plastic binders, such as Teflon, and other nonconductive hydrophobic materials to the electrode. An unintended consequence of this process is a significant reduction in the thermal conductivity of the electrode structure as compared to a structure of the present invention which consists essentially of a 100% conductive active material pressed onto a conductive substrate.

In an embodiment of the sealed NiMH batteries that are a component of the HEV system of the present invention, the buildup of heat generated during overcharge is avoided by using a cell bundle of thermally conductive NiMH electrode material. This thermally conductive NiMH electrode material that contains NiMH particles in intimate contact with each other. Oxygen gas generated during overcharge recombines to form water and heat at the surface of these particles. In the present invention, this heat follows the negative electrode material to the current collector and then to the surface of the case. The thermal efficiency of the bundle of thermally conductive NiMH electrode material can be further improved if this electrode bundle is in thermal contact with a battery case that is also of high thermal conductivity.

In such thermally efficient batteries, the NiMH negative electrode material is preferably a sintered electrode such as described in U.S. Pat. Nos. 4,765,598; 4,820,481; and 4,915, 898 (the contents of which are incorporated by reference)

sintered so that the NiMH particles are in intimate contact with each other.

Yet another aspect of the present invention is a fluid-cooled battery pack systems (as used herein the terms "battery pack" or "pack" refer to two or more electrically interconnected battery modules). Again, it should be noted that during cycling of the batteries they generate large amounts of waste heat. This is particularly true during charging of the batteries, which in a hybrid vehicle is nearly constant. This excess heat can be deleterious and even catastrophic to the battery system. Some of the negative characteristics which are encountered when the battery pack systems have no or improper thermal management include: 1) substantially lower capacity and power; 2) substantially increased self discharge; 3) imbalanced temperatures between batteries and modules leading to battery abuse; and 4) lowered cycle life of the batteries. Therefore, it is clear that to be optimally useful the battery pack systems need proper thermal management.

Some of the factors to be considered in the thermal management of battery pack systems are 1) all batteries and modules must be kept cooler than 65° C. to avoid permanent damage to the batteries; 2) all batteries and modules must be kept cooler than 55° C. to get at least 80% of the battery's rated performance; 3) all batteries and modules must be kept cooler than 45° C. to achieve maximum cycle life; and 4) the temperature difference between individual batteries and battery modules must be kept below 8° C. for optimal performance. It should be noted that the improvements in the instant invention regulate the temperature difference between batteries to less than about 2° C.

The thermal management of the battery pack system must provide adequate cooling to insure optimal performance and durability of the Ni—MH batteries in a wide variety of operating conditions. Ambient temperatures in the U.S. lie in a wide range from at least −30° C. to 43° C. in the lower 49 states. It is necessary to achieve operational usefulness of the battery packs under this ambient temperature range while maintaining, the batteries in their optimal performance range of about −1° C. to 38° C.

Nickel-metal hydride batteries show charge efficiency performance degradation at extreme high temperatures over 43° C. due to problems resulting from oxygen evolution at the nickel positive electrode. To avoid these inefficiencies the battery temperature during charge should ideally be held below 43° C. Nickel-metal hydride batteries also show power performance degradation at temperatures below about −1° C. due to degraded performance in the negative electrode. To avoid low power, the battery temperature should be held above about −1° C. during discharge.

As alluded to above, in addition to degraded performance at high and low temperatures, detrimental effects can occur as a result of temperature differentials between batteries within a module during charge. Large temperature differentials cause imbalances in charge efficiencies of the batteries, which, in turn, can produce state-of-charge imbalances resulting in lowered capacity performance and potentially leading to significant overcharge and overdischarge abuse. To avoid these problems the temperature differential between the batteries should be controlled to less than 8° C. and preferably less than 5° C.

Other factors in the design of a fluid-cooled battery pack system include mechanical considerations. For instance, battery and module packing densities must be as high as possible to conserve space in the end product. Additionally, anything added to the battery pack system to provide for thermal management ultimately reduces the overall energy density of the battery system since it does not contribute directly to the electrochemical capacity of the batteries themselves. In order to meet these and other requirements the instant inventors have designed the fluid-cooled battery pack system of the instant invention.

In its most basic form (an embodiment shown in FIG. 5) the instant fluid-cooled battery pack system 39 includes: 1) a battery-pack case 40 having at least one coolant inlet 41 and at least one coolant outlet 42; 2) at least one battery module 32 disposed and positioned within the case 40 such that the battery module 32 is spaced from the case walls and from any other battery modules 32 within the case 40 to form coolant flow channels 43 along at least one surface of the bundled batteries, the width of the coolant flow channels 43 is optimally sized to allow for maximum heat transfer, through convective, conductive and radiative heat transfer mechanisms, from the batteries to the coolant; and 3) at least one coolant transport means 44 which causes the coolant to enter the coolant inlet means 41 of the case 40, to flow through the coolant flow channels 43 and to exit through the coolant outlet means 42 of the case 40. Preferably, and more realistically, the battery pack system 39 includes a plurality of battery modules 32, typically from 2 to 100 modules, arranged in a 2 or 3 dimensional matrix configuration within the case. The matrix configuration allows for high packing density while still allowing coolant to flow across at least one surface of each of the battery modules 32.

The battery-pack case 40 is preferably formed from an electrically insulating material. More preferably the case 40 is formed from a light weight, durable, electrically insulating polymer material. The material should be electrically insulating so that the batteries and modules do not short if the case touches them. Also, the material should be light weight to increase overall pack energy density. Finally, the material should be durable and capable of withstanding the rigors of the battery pack's ultimate use. The battery pack case 40 includes one or more coolant inlets 41 and outlets 42, which may be specialized fluid ports, where required, but are preferably merely holes in the battery pack case 40 through which cooling-air enters and exits the battery pack.

The fluid cooled battery-pack system 39 is designed to use electrically-insulating coolant, which may be either gaseous or liquid. Preferably the coolant is gaseous and more preferably the coolant is air. When air is used as the coolant, the coolant transport means 44 is preferably a forced-air blower, and more preferably a blower which provides an air flow rate of between 1–3 SCFM of air per cell in the pack.

The blowers do not need to continuously force cooling air into the battery pack, but may be controlled so as to maintain the battery pack temperatures within the optimal levels. Fan control to turn the fan on and off and preferably to control the speed of the fan is needed to provide for efficient cooling during charging, driving, and idle stands. Typically, cooling is most critical during charge, but is also needed during aggressive driving. Fan speed is controlled on the basis of the temperature differential between the battery pack and ambient, as well as on the basis of absolute temperature, the latter so as not to cool the: battery when already it is already cold or so as to provide extra cooling when the battery nears the top of its ideal temperature range. For nickel-metal hydride batteries, fans are also needed in idle periods after charge. Intermittent cooling is needed to provide for efficient cooling under this condition and results in net energy savings by keeping self discharge rates below fan power consumption. A typical result shows a fan on time of 2.4 hours after the initial post charge cool down. Typically the normal fan control procedure (described below) works well in this scenario. Fan control allows for the use of powerful fans for efficient cooling when needed without the consumption of full fan power at all times, thus keeping energy efficiency high. The use of more powerful fans is beneficial in terms of maintaining optimal pack temperature which aids in optimization of pack performance and life.

One example of a fan control procedure provides that, if the maximum battery temperature is over 30° C. and the ambient temperature is lower (preferably 5° C. or more lower) than the maximum battery temperature then the fans will turn on and circulate cooler air into the coolant channels.

The flow rate and pressure of the cooling fluid needs to be sufficient to provide sufficient heat capacity and steady state removal of heat at the maximum anticipated sustained heat generation rate to result in an acceptable temperature rise. In typical Ni-MH battery packs, with 5–10 W per cell generated during overcharge (maximum heat generation), a flow rate of 1–3 CFM of air per cell is needed to provide adequate cooling simply on the basis of the heat capacity of air and achieving an acceptable temperature rise. Radial blower type fans may be used to provide the most effective airflow for thermal management. This is due to the higher air pressure generated by these fan types as contrasted with that generated by axial fans. Generally, a pressure drop of at least 0.5" of water is required at the operating point of the fan as installed in the pack. To produce this pressure drop at high flow rates generally requires a fan static pressure capability of 1.5" to 3" of water.

In addition to using the fans to cool the battery pack when it is hot, the fans can heat the battery pack when it is too cold. That is, if the battery pack is below its minimum optimal temperature, and the ambient air is warmer than the battery pack, the fans may be turned on to draw warmer ambient air into the battery pack. The warmer air then transfers its thermal energy to the battery pack and warms it to at least the low end of the optimal range of temperature.

One or more coolant transport means 44 can be positioned at the coolant inlet 41 to force fresh coolant into the battery pack case 40, through coolant flow channels 43, and out of the coolant outlet 42. Alternatively, one or more coolant transport means 44 can be positioned at the coolant outlet 42 to draw heated coolant out of the battery pack case 40, causing fresh coolant to be drawn into the battery pack case 40 via the coolant inlet 41, and to flow through the coolant flow channels 43.

The coolant may flow parallel to the longest dimension of the coolant flow channels 43 (i.e. in the direction of the length of the battery modules) or, alternatively, it may flow perpendicular to the longest dimension of said coolant flow channels 43, (i.e. in the direction of the height of the batteries as it flows through the cooling channels 43, the coolant heats up. Therefore, it is preferable that the fluid flow perpendicular to the longest dimension of the cooling channels 43. This is because as the coolant heats up, the temperature difference between the batteries and the coolant decreases and therefore, the cooling rate also decreases. Thus the total heat dissipation is lowered. To minimize this effect, the coolant flow path should be the shorter of the two, i.e. along the height of the batteries.

While air is the most preferred coolant (since it is readily available and easy to transport into and out of the case) other gases and even liquids may be used. Particularly, liquid coolants such as Freon or ethylene glycol, as well as other commercially available fluorocarbon and non-fluorocarbon based materials may be used. When these other gases or liquids are used as the coolant, the coolant transport means 44 may preferably be a pump. When using coolants other than air, the coolant transport means may preferably include a coolant return line attached to the coolant outlet 42 which recycles heated coolant to a coolant reservoir (not shown) from which it is transferred to a coolant heat exchanger (not shown) to extract heat therefrom and finally redelivered to the coolant pump 44 for reuse in the cooling of the battery pack 39.

The optimized coolant flow channel width incorporates many different factors. Some of these factors include the number of batteries, their energy density and capacity, their charge and discharge rates, the direction, velocity and volumetric flow rate of the coolant, the heat capacity of the coolant and others. It has been found that independent of most of these factors, it is important to design the cooling channels 43 to impede or retard the cooling fluid flow volume as it passes between the modules. Ideally, the retardation in flow is predominantly due to friction with the cell cooling surfaces, which results in a flow reduction of 5 to 30% in flow volume. When the gaps between modules form the major flow restriction in the cooling fluid handling system, this produces a uniform and roughly equal cooling fluid flow volume in the gaps between all modules, resulting in even cooling, and reducing the influence of other flow restrictions (such as inlets or exits) which could otherwise produce nonuniform flow between the modules. Furthermore, the same area of each cell is exposed to cooling fluid with similar velocity and temperature.

Battery modules are arranged for efficient cooling of battery cells by maximizing the cooling fluid velocity in order to achieve a high heat transfer coefficient between the cell surface and the cooling fluid. This is achieved by narrowing the intermodule gap to the point that the cooling fluid also helps raise the heat transfer coefficient as the shorter distance for heat transfer in the cooling fluid raises the cell to fluid temperature gradient.

The optimal coolant flow channel width depends on the length of the flow path in the direction of flow as well as on the area of the coolant flow channel in the plane perpendicular to the flow of the coolant. There is a weaker dependence of optimal gap on the fan characteristics. For air, the width of the coolant flow channels 43 is between about 0.3–12 mm, preferably between 1–9 mm, and most preferably between 3–8 mm. For vertical air flow across a module 7 inches high, the optimal achievable mean module spacing (width of the coolant flow channels 43) is about 3–4 mm (105 mm centerline spacing). For horizontal air flow lengthwise across 4 modules 16 inches long in a row for a total distance of 64 inches, the optimal achievable mean module spacing (width of the coolant flow channels 43) is about 7–8 mm (109 mm centerline spacing). Slightly closer intermodule spacing at the far end of this row will result in a higher airflow rate and consequently a higher heat transfer coefficient, thus compensating for the higher air temperature downstream. A secondary inlet or series of inlets partway along the horizontal coolant flow path can also be used as a means of introducing additional coolant, thus making the heat transfer between the battery cells and the coolant more uniform along the entire flow path.

In should be noted that the term "centerline spacing" is sometimes used synonymously with coolant flow channel width. The reason for this is that the quoted coolant flow channel widths are average numbers. The reason for this averaging is that the sides of the battery modules which form the flow channels 43 are not uniformly flat and even, the banding which binds the modules together and the sides of the batteries themselves cause the actual channel width to vary along its length. Therefore; it is sometimes easier to describe the width in terms for the spacing between the centers of the individual modules, i.e. the centerline width, which changes for batteries of different sizes. Therefore, it is generically more useful to discuss an average channel width, which applies to battery modules regardless of the actual battery size used therein.

To assist in achieving and maintaining the proper spacing of the modules within the pack case and to provide electrical isolation between the modules, each module includes coolant-flow-channel spacers 37 which hold the modules 32 at the optimal distance from any other modules 32 and from the battery pack case 40 to form the coolant flow channels 43. As disclosed above, the coolant-flow-channel spacers 37 are preferably positioned at the top and bottom of the battery modules 32, providing protection to the corners, of the modules 32, the battery terminals 7, 8 and the electrical interconnects 25. More importantly, tabs on the sides of the spacers 38 hold the modules at the optimal distance apart. The spacers 37 are preferably formed from a light weight, electrically non-conductive material, such as a durable polymer. Also, it is important to the overall pack energy density that the spacers include as little total material as possible to perform the required function and still be as light as possible.

As mentioned above Ni-MH batteries operate best in a specific temperature range. While the cooling system described above enables the battery pack systems of the instant invention to maintain operating temperatures lower than the high temperature limit of the optimal range (and sometimes to operate above the lower temperature limit of the optimal range, if the ambient air temperature is both warmer than the battery and warmer than the lower temperature limit of the optimal range), there are still times when the battery system will be colder than the lower limit of optimal temperature range. Therefore, there is a need to somehow provide variable thermal insulation to some or all or of the batteries and modules in the battery pack system.

In addition to the cooling systems described above, another way to thermally control the battery pack systems of the instant invention is by the use of temperature dependant charging regimens. Temperature dependent charge regimens allow for efficient charging under a variety of ambient temperature conditions. One method involves charging the batteries to a continuously updated temperature dependent voltage lid which is held until the current drops to a specified value after which a specified charge input is applied at constant current. Another method involves a series of decreasing constant current or constant power steps to a temperature compensated voltage limit followed by a specified charge input applied at a constant current or power. Another method involves a series of decreasing constant current or constant power steps terminated by a maximum measured rate of temperature rise followed by a specified charge input applied at a constant current or power. Use of temperature dependant voltage lids ensures even capacity over a wide range of temperatures and ensures that charge completion occurs with minimal temperature rise. For example, use of fixed voltage charge lids results in an 8° C. temperature rise. Absolute charge temperature limits (60° C.) are required for this battery to avoid severe overheating which can occur in the case of simultaneous failure of charger and cooling system. Detection of rate of change of voltage with respect to time (dV/dt) on a pack or module basis allows a negative value of dV/dt to serve as a charge terminator. This can prevent excessive overcharge and improves battery operating efficiency as well as serving as an additional safety limit.

As discussed above, in addition to having an upper limit on the operational temperature range of the instant batteries, there is also a lower limit. As also discussed above, the cooling system can be used as a heating system. However, it is much more likely that if the battery pack temperature is low, the ambient temperature will also be low, and probably lower than the battery pack temperature. Therefore, there will be times during operational use of the battery pack system when it will be advantageous to thermally insulate the batteries from the ambient. However, the need for thermal insulation will not be constant and may vary dramatically in only a matter of a very short time period. Therefore, the thermal insulation need will also be variable.

In order to accommodate this variable need for thermal insulation, the instant inventors have devised a means for providing variable thermal insulation. The inventive variable thermal insulation means can be used on individual batteries, battery modules and battery pack systems alike.

In its most basic form, the means provides variable thermal insulation to at least that portion of the rechargeable battery system which is most directly exposed to said ambient thermal condition, so as to maintain the temperature of the rechargeable battery system within the desired operating range thereof under variable ambient conditions.

To provide this variable thermal insulation, the inventors have combined temperature sensor means and compressible thermal insulation means. When the temperature sensor indicates that the ambient is cold, the thermal insulation is positioned in the needed areas to insulated the affected areas of the battery, module or battery pack system. When the ambient is warmer, the temperature sensor causes the thermal insulation to be partly or wholly compressed such that the insulation factor provided to the battery system by the compressible insulation is partially or totally eliminated.

The thermal sensors may be electronics which variably increases or decreases the insulation. The thermal sensors may be electronic sensors which feed information to piston devices which variably increases or decreases the compression upon a compressible foam or fiber insulation. Alternatively, (and more preferably from an electrical energy utilization and mechanical reliability point of view,) the sensor and compression devices may be combined in a single mechanical devices which causes variable compression upon the thermal insulation in direct reaction to the ambient thermal condition. Such a combined sensor/compression device and be formed from a bimetallic material such as the strips used in thermostats. Under low ambient temperatures, the bimetallic device will allow the thermal insulation to expand into place to protect the battery system from the cold ambient conditions, but when the temperature of the battery or ambient rises, the bimetal device compresses the insulation to remove its insulating effect from the battery system.

While the variable thermal insulation can be used to completely surround the entire battery, module or battery pack system, it is not always necessary to do so. The variable thermal insulation can be just as effective when it only insulates the problems spots of the system. For example, in the battery modules and pack systems of the instant invention, which employ ribbed end plates, it may only be necessary for modules which are most directly influenced by low temperature ambient conditions. These ambient conditions may cause large temperature imbalances between the batteries of the module(s) and as a result degrade the performance of the module or pack system. By providing variable insulation to the affected end(s) of the module(s) the temperature differential between the batteries can be reduced or eliminated and the overall temperature of the module(s) can be controlled.

The battery case of the present invention is preferably constructed of a metallic material such as steel. In a preferred embodiment, the metallic material is stamped, embossed, or shaped to form pressure containing surfaces that counter the internal pressure of the sealed battery and thus prevent bulging of the case. Bulging is detrimental to individual batteries because it alters the electrolyte distribution and spatial orientation of the electrodes and separators. Alternatively, a cylindrical metallic case can be used.

In all commercial, sealed, metal hydride batteries, the positive electrode is designed to be capacity limited. This means that the positive electrode reaches full charge before the negative electrode. When this occurs, oxygen gas evolves at the positive electrode in proportion to the current supplied. In overcharge, ail current is producing oxygen gas. In order for the battery to remain sealed, there must be a recombination mechanism for the oxygen gas that is evolved.

One recombination mechanism involves the diffusion of oxygen gas generated at the positive electrode through the separator to the surface of the metal hydride electrode where it recombines. The rate limiting step of this mechanism is the diffusion of the oxygen gas through the electrolyte film to reach the surface of the metal electrode. Once the oxygen gas reaches the surface of the electrode, gas recombination is rapid. If, however, the oxygen must diffuse through a thick film of electrolyte on the surface of the negative electrode, gas recombination rates will be slowed significantly. Thus, the rate of the reaction is proportional to the amount of electrolyte at the surface of the electrode. This amount is referred to as the film thickness of the electrolyte.

An additional aspect of the present invention is a hydrophobic treatment that acts to significantly decrease this film thickness. The described hydrophobic treatment produces a thin electrolyte film precisely where it is the most beneficial, at the surface of the metal hydride negative electrode.

The present invention recognizes that a hydrophobic treatment is most important at the outer surfaces of the metal hydride electrode and, in particular, at the metal-electrolyte interface. The present invention involves a small thin coating on the surface of either the negative electrode or the surface of the separator in contact with the negative electrode. This provides a degree of hydrophobicity where it is needed. The coating of the present invention has a tremendous advantage over the prior art because while the surface of the negative electrode is rendered hydrophobic, the interior remains unaffected. This is because the gas state combination occurs only on the outer surface of the negative. Thus the presence of a hydrophobic interior, as in the prior art, is actually detrimental to electrolyte absorption rates, overall electrolyte absorption, power, cycle life, low temperature, and other performance parameters related to the negative electrode.

It is common for manufacturers of NiMH batteries to mix an organic binder, such as polytetrafluoroethylene (PTFE), with the metal hydride negative electrode alloy powder to prevent cracking and loss of the metal hydride materials. Such a formulation results in hydrophobic material in the bulk of the electrode (thereby increasing electrode resistance) and the resulting hydrophobicity reduces the effectiveness of the initial etch in removing surface impurities. In addition, hydrophobic binders in the bulk reduce electrolyte absorption which lowers cycle life, decreases conductivity, and takes up space.

Contrary to the teachings of the present application, JP A 4-277467 teaches making the electrode surface hydrophilic by spraying it with alcohol in order to improve the internal pressure.

Unexpectedly, the inventors of the present invention found that in addition to using a negative electrode where the surface facing the separator had been treated to render it hydrophobic it was also possible to attain similar results by using a separator and an untreated negative electrode where the surface of separator facing the negative electrode had been treated to make it hydrophobic. Without wishing to be bound by theory, it is believed that hydrophobic material on the surface of the separator facing the negative electrode is in such intimate contact with the negative electrode that it reduces the film thickness of the electrolyte on the electrode as if the negative electrode itself had been treated.

While at first glance it might appear advantageous to treat the surface of the negative electrode and the surface of the separator facing the negative electrode to render them both hydrophobic, the inventors have found that this is not effective. When both surfaces are treated, the thickness of the resulting hydrophobic material is so great that oxygen recombination is significantly slowed.

This is the case in JP A 5-242908 which describes using a layer of PTFE between the negative electrode and the separator (effectively treating both, the surface of the negative electrode and the surface of the separator). While JP A 5-242908 discusses the advantages of oxygen recombination on the electrode, a table in JP A 5-242908 shows cell pressures reduced only to a range of from 81–114 psi. (The temperature of the cells is not indicated.) These pressures are much greater than the pressures in cells of the present invention, as shown in Table 1, below. The use of a coated electrode or separator as described in the present invention, avoids the problems inherent in an extra layer. A coated electrode according to the present invention simplifies and reduces the cost of assembly because the coating can be applied prior to assembly. Using a thin film layer of PTFE between the separator and the electrode would generate a variety of problems during assembly. For example, stretching could produce non-uniform porosity that would produce non-uniform gas recombination and diffusion rates. A coated electrode effectively permits the use of a much thinner hydrophobic layer so that uniform and rapid oxygen recombination is encouraged without impeding diffusion rates.

The present invention is effective with all types of battery systems in which oxygen is evolved at the positive electrode during overcharge. The present invention is particularly useful with nickel metal hydride systems (such as the ones commonly referred to as Ovonic systems, $AB_2$ systems, $AB_5$ systems, and mischmetal systems). Most particularly, the present invention is useful with alloys of the type described in copending U.S. patent application Ser. No. 08/259,793, filed Jun. 14, 1994, titled ELECTROCHEMICAL HYDROGEN STORAGE ALLOYS AND BATTERIES FABRICATED FROM MG CONTAINING BASE ALLOYS.

The present invention is particularly useful in batteries of the HEV system of the present invention because such batteries must undergo numerous quick charge/discharge cycles. This is because quick charging results in earlier oxygen gas generation. In batteries that are being quick charged it is also important that the oxygen generated during these periods of overcharge be recombined quickly to prevent venting and loss of capacity. In addition, the present invention is particularly effective at high temperatures, which increases its usefulness in batteries that are going to be quick charged. Obviously, the use of the thermal management system described above will increase the efficiencies of such gas recombination.

While a 1% PTFE suspension is specifically demonstrated below, any suitable hydrophobic treatment may be used that will reduce the film thickness of the electrolyte at the surface of the metal hydride negative electrode. Cells of the present invention suffer no performance tradeoffs in cycle life, power, charge retention, or low temperature performance as a result of the hydrophobic treatment.

While any metal hydride alloy may be used, cells of the present invention are preferably fabricated from low pressure negative electrode materials such as those described in U.S. Pat. No. 5,277,999, the contents of which are incorporated by reference. Such hydrogen storage alloys have the composition

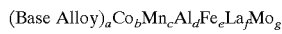

(Base Alloy)$_a$Co$_b$Mn$_c$Al$_d$Fe$_e$La$_f$Mo$_g$ where Base Alloy represents a disordered multicomponent alloy having at least one structure selected from the group consisting of amorphous, microcrystalline, polycrystalline (lacking long-range compositional order with three or more phases of the polycrystalline structure), and any combination of these structures; b is 0 to 7.5 atomic percent, preferably 4 to 7 atomic percent; c is 0 to 8.5 atomic percent, preferably 6 to 8 atomic percent; d is 0 to 2.5 atomic percent, preferably 0.1 to 2 atomic percent; e is 0 to 6 atomic percent, preferably 1 to 3 atomic percent or 5.3 to 6 atomic percent; f is 0 to 4.5 atomic percent, preferably 1 to 4 atomic percent; g is 0 to 6.5 atomic percent, preferably 0.1 to 6 atomic percent, most preferably about 6 atomic percent; b+c+d+e+f+g>0; and a+b+c+d+e+f+g=100 atomic percent. A preferred formulation of this Base Alloy contains 0.1 to 60 atomic percent Ti, 0.1 to 25 atomic percent Zr, 0.1 to 60 atomic percent V, 0.1 to 57 atomic percent Ni, and 0.1 to 56 atomic percent Cr and b is 4 to 7 atomic percent; c is 6 to 8 atomic percent; d is 0.1 to 2 atomic percent; e is 1 to 2 atomic percent; f is 0.1 to 4 atomic percent; and g is 0.1 to 6 atomic percent; b+c+d+e+f+g>0; and a+b+c+d+e+f+g=100 atomic percent.

While any positive electrode material compatible with metal hydroxide negative electrodes may be used (such as nickel hydroxide), the positive electrodes of the present invention are preferably of the type described in U.S. Pat. Nos. 5,344,782, 5,348,822, 5,523,182, 5,569,562, and 5,567,549. These electrodes are locally ordered, disordered, high capacity, long cycle life positive electrodes comprising a solid solution nickel hydroxide electrode material having a multiphase structure and at least one compositional modifier to promote the multiphase structure. The multiphase posi-phase unit cell comprising spacedly disposed plates with at least one ion incorporated around the plates, the plates having a range of stable intersheet distances corresponding to a 2+ oxidation state and a 3.5+, or greater, oxidation state. The at least one compositional modifier is a metal, a metallic oxide, a metallic oxide alloy, a metal hydride, and/or a metal hydride alloy. Preferably the at least one compositional modifier is chosen from the group consisting of Al, Bi, Co, Cr, Cu, Fe, Ln, LaH$_3$, Mn, Ru, Sb, Sn, TiH$_2$, TiO, Zn.

The separators and bags of the present material are made from material described in detail in U.S. Pat. No. 5,330,861, the contents of which are incorporated by reference. Described in detail in this application are electrolyte retentive nylon and wettable polypropylene materials that are non-reactive with H$_2$ gas and alkaline electrolyte. The retentive nylon material is capable of absorbing and retaining more electrolyte solution than standard nylon separators. The wettable polypropylene separators are grafted polypropylene material that retain and absorb electrolyte so that particles, barbs, and residues are not produced. Grafted polypropylene material is preferably used for both the separators and the bags of the cells of the present invention.

While the improvements of the battery electrodes described herein are directed toward both the positive and the negative electrodes, this is in no way intended to be limiting. Thus the formation of batteries of the invention comprising sintered negative electrodes combined with enhanced conductivity positive electrodes, or prior art pasted negative electrodes combined with enhanced conductivity positive electrodes, or enhanced conductivity negative electrodes combined with prior art positive electrodes, or enhanced conductivity negative electrodes combined with enhanced conductivity positive electrodes are all intended to be within the scope of the present invention. (The phrase "enhanced conductivity" as used herein is intended to specifically refer to the negative or positive electrodes of the batteries of the present invention.)

EXAMPLES

Example 1

Cells embodying those of the present HEV system and those of the prior art are described in Table 1, below.

TABLE 1

|  | Comparison | HEV Prototype | HEV Optimized Prototype |
| --- | --- | --- | --- |
| power density (W/L) | 1300 | 1600 | 2700 |
| specific power (W/kg) | 600 | 600 | 1000 |
| energy density (Wh/L) | 120 | 190 | 160 |
| specific energy (Wh/Kg) | 55 | 70 | 60 |
| negative electrode construction | pasted | Cu substrate | Cu substrate, thin electrodes |
| negative current collector | nickel | copper | copper |
| negative alloy composition | misch metal | V$_{18}$Ti$_{15}$Zr$_{18}$Ni$_{29}$Cr$_5$Co$_7$Mn$_8$ | V$_{18}$Ti$_{15}$Zr$_{18}$Ni$_{29}$Cr$_5$Co$_7$Mn$_8$ |
| positive electrode | pasted Ni(OH)$_2$ thin | pasted γ-phase Ni(OH)$_2$ thick | pasted γ-phase Ni(OH)$_2$ with conductive additives thin |
| separator | polypropylene thin | polypropylene thin | polypropylene thin |
| case | plastic | stainless steel | stainless steel |
| aspect ratio | square | square | square |
| top | plastic | stainless steel | stainless steel |
| tabs | thick | thick/laser welded | thick/laser welded |

As can be seen from Table 1, the embodiments of the invention, the HEV prototype cells and HEV optimized prototype cells represent improvements over the comparison cells in accordance with the prior art. In particular, the HEV optimized prototype embodies the most dramatic improvements.

Table 1 shows that the Cu substrate of the invention provides the improved current conduction essential for reducing internal resistance. Similarly, the use of conductive additives, such as nickel fibers, nickel plated graphite particles, nickel plated copper particles, nickel plated copper fibers, or the use of a conductive mat embedded in the pasted negative electrode material all contribute to the conductivity of the positive electrode. In addition, the use of thick tabs that are laser welded assures that the improved conductivity of the electrodes is not lost at the collection points. Alternately, negative electrodes having the composition $Ti_{10}Zr_{28}Ni_{36}Cr_5Co_5Mn_{16}$ may be used.

Example 2

The impact of the thermally conductive electrodes of the present invention can be evaluated independently. Comparison cells and thermally conductive cells were fabricated as described in Table 2.

TABLE 2

|  | Comparison Cell | Thermally conductive cells |
|---|---|---|
| capacity | 100 Ah | 100 Ah |
| energy density | ≈70 Wh/kg | ≈70 Wh/kg |
| negative electrode construction | pasted | sintered, compacted |
| negative alloy composition | misch metal | $V_{18}Ti_{15}Zr_{18}Ni_{29}Cr_5Co_7Mn_8$ |
| positive electrode | Ni(OH)$_2$ pasted onto foam substrate | Ni(OH)$_2$ pasted onto foam substrate |
| case | plastic | stainless steel |
| top | plastic | stainless steel |
| temperature after cycling (charge/ discharge cycling at C/10 overcharge to 120% of capacity | 80° C. | 34° C. |

Example 3

Cells (1–7 in Table 3, below) were fabricated as described in U.S. Pat. No. 5,330,861 using a high loft polypropylene separator and negative electrode alloy having the following composition:

$V_{18}Ti_{15}Zr_{18}Ni_{29}Cr_5Co_7Mn_8$ except that the separators were sprayed with 1% aqueous solutions of PTFE on the side facing the negative electrode prior to assembling the cell. The control cells (designated C1–C7 in Table 3, below) were assembled using untreated separators.

These cells were charged and discharged at the indicated temperatures. The cells having the 1% PTFE coating on the surface of the separator demonstrated a consistent pressure reduction. As can be seen, this effect is even more pronounced at elevated temperatures and represents a significant improvement over the prior art. Table 3 also shows that cells of the present invention suffer no tradeoffs in terms of capacity.

TABLE 3

|  | Temperature (° C.) | Overcharge Pressure (psi) | Capacity (Ah) |
|---|---|---|---|
| C1 | 0 | 32 | 4.77 |
| C2 | 10 | 39 | 4.58 |
| C3 | 20 | 89 | 4.46 |

TABLE 3-continued

|  | Temperature (° C.) | Overcharge Pressure (psi) | Capacity (Ah) |
|---|---|---|---|
| C4 | 30 | 113 | 4.53 |
| C5 | 40 | 136 | 4.53 |
| C6 | 50 | 175 | 4.45 |
| C7 | 60 | 138 | 3.97 |
| 1% Teflon |  |  |  |
| 1 | 0 | 46 | 4.76 |
| 2 | 10 | 44 | 4.45 |
| 3 | 20 | 42 | 4.47 |
| 4 | 30 | 47 | 4.52 |
| 5 | 40 | 55 | 4.54 |
| 6 | 50 | 75 | 4.49 |
| 7 | 60 | 63 | 4.02 |

It is obvious to those skilled in the art that additional combinations of the components described above can be made without departing from spirit and scope of the present invention. For example, extensive addition of conductive components such as metallic nickel or copper powder to a pasted electrode is anticipated. The discussion and description of this specification are merely illustrative of particular embodiments of the invention and are not meant as limitations upon the invention. It is the following claims, including all equivalents, that define the scope of the invention.

While the invention has been described in connection with preferred embodiments and procedures, it is to be understood that it is not intended to limit the invention to the preferred embodiments and procedures. On the contrary, it is intended to cover all alternatives, modifications and equivalence which may be included within the spirit and scope of the invention as defined by the claims below.

What is claimed is:

1. A hybrid electric vehicle drive system, comprising:
   a combustion engine;
   an electric motor; and
   at least one nickel-metal hydride battery module providing electric power to said electric motor, said at least one nickel-metal hydride battery module having an internal resistance effective to provide a peak power density P of at least 800 Watts/kilogram and an energy density E of at least 40 Watt-hours/kilogram.

2. The drive system of claim 1, wherein said peak power density is at least 1000 Watts/kilogram.

3. The drive system of claim 1, wherein said energy density is at least 45 Watt-hours/kilogram.

4. The drive system of claim 1, wherein said at least one battery module includes negative electrodes having porous metal substrates formed substantially of copper.

5. A hybrid electric vehicle, comprising:
   a power system comprising:
      a combustion engine, and
      an electric motor; and
   at least one nickel-metal hydride battery module coupled to said power system and providing electric power to said electric motor, said battery module having an internal resistance effective to provide a peak power density P of at least 800 Watts/kilogram and an energy density E of at least 40 watt-hours/kilogram.

6. The hybrid electric vehicle of claim 5, wherein said peak power density is at least 1000 Watts /kilogram.

7. The hybrid electric vehicle of claim 5, wherein said energy density is at least 45 Watt-hours/kilogram.

8. The hybrid electric vehicle of claim 5, further comprising a regenerative braking system providing charging current for said at least one nickel-metal hydride battery module.

9. The hybrid electric vehicle of claim 5, further comprising a cooling system for cooling said at least one nickel-metal hydride battery module.

10. The hybrid electric vehicle of claim 9, wherein said cooling system includes:
 a battery-pack case, said case including at least one coolant inlet means and at least one coolant outlet means, said at least one battery module disposed within said case, said at least one battery module being positioned within said case such that said battery module and said case, and/or said battery module and another battery module form coolant flow channels along at least one surface of said battery module; and
 at least one coolant transport means, said coolant transport means causing said coolant to enter said coolant inlet means of said case, to flow through said coolant flow channels and to exit said coolant outlet means of said case.

11. The hybrid electric vehicle of claim 10, wherein the width of said coolant flow channels is sized so that said cooling system maintains the temperature of said at least one battery module below 65° C.

12. The hybrid electric vehicle of claim 11, wherein the width of said coolant flow channels is sized so that said cooling system maintains the temperature difference between said at least one battery module below 8° C.

13. The hybrid electric vehicle of claim 9, wherein said cooling system uses a liquid coolant.

14. The hybrid electric vehicle of claim 5, wherein said at least one nickel-metal hybride battery module includes negative electrodes and positive electrodes.

15. The hybrid electric vehicle of claim 14, wherein said negative electrodes include porous metal substrates formed substantially of copper.

16. The hybrid electric vehicle of claim 14, wherein said negative electrodes include a hydrogen storage alloy comprising the following composition:

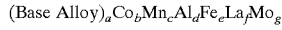

were
 Base Alloy represents a disordered multicomponent alloy having at least one structure selected from the group consisting of amorphous, microcrystalline, polycrystalline, and any combination of these structures;
 b is 0 to 7.5 atomic percent;
 c is 0 to 8.5 atomic percent;
 d is 0 to 2.5 atomic percent;
 e is 0 to 6 atomic percent;
 f is 0 to 4.5 atomic percent;
 g is 0 to 6.5 atomic percent;
 b+c+d+e+f+g>0; and
 a+b+c+d+e+f+g=100 atomic percent.

17. The hybrid electric vehicle of claim 14, wherein said negative electrodes include an $AB_2$ type hydrogen storage alloy.

18. The hybrid electric vehicle of claim 14, wherein said negative electrodes include an $AB_5$ type hydrogen storage alloy.

19. The hybrid electric vehicle of claim 14, wherein positive electrodes include disordered γ-phase nickel hydroxide active material.

20. The hybrid electric vehicle of claim 14, wherein said positive electrodes include a conductive material added to a nickel hydroxide active material, said conductive material selected from the group consisting of nickel particles, nickel fibers, graphite particles, nickel plated graphite particles, nickel plated copper particles, nickel plated copper fibers, nickel flakes, and nickel plated copper flakes.

21. A hybrid electric vehicle drive system, comprising:
 a combustion engine;
 an electric motor; and
 at least one nickel-metal hydride battery module providing electric power to said electric motor, said at least one nickel-metal hydride battery module having an internal resistance effective to provide a peak power density P of at least 1000 Watts/kilogram and an energy density E of at least 30 Watt-hours/kilogram.

22. The drive system of claim 21, wherein said energy density is at least 35 Watt-hours/kilogram.

23. The drive system of claim 21, wherein said energy density is at least 40 Watt-hours/kilogram.

24. The drive system of claim 21, wherein said at least one battery module includes negative electrodes having porous metal substrates formed substantially of copper.

25. A hybrid electric vehicle comprising:
 a power system comprising:
  a combustion engine, and
  an electric motor; and
 at least one nickel-metal hydride battery module coupled to said power system and providing electric power to said electric motor, said battery module having an internal resistance effective to provide a peak power density P of at least 1000 Watts/kilogram and an energy density E of at least 30 Watt-hours/kilogram.

26. The hybrid electric vehicle of claim 25, wherein said peak power density is at least 35 Watts/kilogram.

27. The hybrid electric vehicle of claim 25, wherein said energy density is at least 40 Watt-hours/kilogram.

28. The hybrid electric vehicle of claim 25, further comprising a regenerative braking system providing charging current for said at least one nickel-metal hydride battery module.

29. The hybrid electric vehicle of claim 25, further comprising a cooling system for cooling said at least one nickel-metal hydride battery module.

30. The hybrid electric vehicle of claim 29, wherein said cooling system includes:
 a battery-pack case, said case including at least one coolant inlet means and at least one coolant outlet means, said at least one battery module disposed within said case, said at least one batter module being positioned within said case such that said battery module and said case, and/or said battery module and another battery module form coolant flow channels along at least one surface of said battery module; and
 at least one coolant transport means, said coolant transport means causing said coolant to enter said coolant inlet means of said case, to flow through said coolant flow channels and to exit said coolant outlet means of said case.

31. The hybrid electric vehicle of claim 30, wherein the width of said coolant flow channels is sized so that said cooling system maintains the temperature of said at least one battery module below 65° C.

32. The hybrid electric vehicle of claim 31, therein the width of said coolant flow channels is sized so that said cooling system maintains the temperature difference between said at least one battery module below 8° C.

33. The hybrid electric vehicle of claim 29, wherein said cooling system uses a liquid coolant.

34. The hybrid electric vehicle of claim 25, wherein said at least one nickel-metal hydride battery module includes negative electrodes and positive electrodes.

35. The hybrid electric vehicle of claim 34, wherein said negative electrodes include porous metal substrates formed substantially of copper.

36. The hybrid electric vehicle of claim 34, wherein said negative electrodes include a hydrogen storage alloy comprising the following composition:

$$(\text{Base Alloy})_a\text{Co}_b\text{Mn}_c\text{Al}_d\text{Fe}_e\text{La}_f\text{Mo}_g$$

were

Base Alloy represents a disordered multicomponent alloy having at least one structure selected from the group consisting of amorphous, microcrystalline, polycrystalline, and any combination of these structures;

b is 0 to 7.5 atomic percent;

c is 0 to 8.5 atomic percent;

d is 0 to 2.5 atomic percent;

e is 0 to 6 atomic percent;

f is 0 to 4.5 atomic percent;

g is 0 to 6.5 atomic percent;

b+c+d+e+f+g>0; and a+b+c+d+e+f+g=100 atomic percent.

37. The hybrid electric vehicle of claim 34, wherein said negative electrodes include n $AB_2$ type hydrogen storage alloy.

38. The hybrid electric vehicle of claim 34, wherein said negative electrodes include a $AB_5$ type hydrogen storage alloy.

39. The hybrid electric vehicle of claim 34, wherein said positive electrodes include a disordered γ-phase nickel hydroxide active material.

40. The hybrid electric vehicle of claim 34, wherein said positive electrodes include a conductive material added to a nickel hydroxide active material, said conductive material selected from the group consisting of nickel particles, nickel fibers, graphite particles, nickel plated graphite particles, nickel plated copper particles, nickel plated copper fibers, nickel flakes, and nickel plated copper flakes.

* * * * *